(12) United States Patent
Otosaka

(10) Patent No.: US 8,881,552 B2
(45) Date of Patent: Nov. 11, 2014

(54) APPARATUS FOR FABRICATING A GLASS ROD AND METHOD OF SAME

(75) Inventor: Tetsuya Otosaka, Annaka (JP)

(73) Assignee: Shin-Etsu Chemical Co., Ltd., Tokyo (JE)

( * ) Notice: Subject to any disclaimer, the term of this patent is extended or adjusted under 35 U.S.C. 154(b) by 0 days.

(21) Appl. No.: 13/226,656

(22) Filed: Sep. 7, 2011

(65) Prior Publication Data

US 2012/0060560 A1    Mar. 15, 2012

(30) Foreign Application Priority Data

Sep. 8, 2010 (JP) .................................. 2010-200506
Sep. 6, 2011 (JP) .................................. 2011-194106

(51) Int. Cl.
  *C03B 37/07* (2006.01)
  *C03B 37/012* (2006.01)

(52) U.S. Cl.
  CPC .............................. *C03B 37/01242* (2013.01)
  USPC .................................. 65/382; 65/381; 65/435

(58) Field of Classification Search
  CPC ................................................. C03B 37/01242
  USPC ............................................. 65/381, 382, 435
  See application file for complete search history.

(56) References Cited

U.S. PATENT DOCUMENTS

| | | | |
|---|---|---|---|
| 5,314,517 A | | 5/1994 | Koenig |
| 5,755,849 A | * | 5/1998 | Hoshino et al. ................... 65/381 |
| 6,134,922 A | | 10/2000 | Shimada et al. |
| 6,220,057 B1 | | 4/2001 | Yamamura |
| 6,324,871 B1 | * | 12/2001 | Nakamura et al. ............... 65/421 |
| 2005/0132753 A1 | * | 6/2005 | Shimizu et al. ................... 65/381 |
| 2006/0086148 A1 | * | 4/2006 | Mileo et al. ...................... 65/382 |
| 2009/0260401 A1 | * | 10/2009 | Shin et al. ........................ 65/435 |

FOREIGN PATENT DOCUMENTS

| | | |
|---|---|---|
| CN | 101481210 | 7/2009 |
| JP | 61-014149 | 1/1986 |
| JP | 63-195139 | 8/1988 |
| JP | 2-275723 | 11/1990 |
| JP | 11-011970 | 1/1999 |
| JP | 2004-189579 | 7/2004 |
| JP | 2005-145765 | 6/2005 |

(Continued)

OTHER PUBLICATIONS

Machine translation of JP 2005-145765, Method for Controlling Outer Diameter of Glass Preform and Apparatus for Drawing Glass Preform, Misawa, Masahiro et al. Jun. 9, 2005.*

(Continued)

*Primary Examiner* — Queenie Dehghan
(74) *Attorney, Agent, or Firm* — Workman Nydegger

(57) ABSTRACT

The present invention provides an apparatus and a method for fabricating a glass rod from a glass preform capable of suppressing a diameter fluctuation of the drawn glass rod even when there is a relatively large diameter reduction ratio between the glass preform and the glass rod, such as 60 to 95%. The diameter (D) of the glass preform for determining the ratio from a measured diameter data is acquired from measured diameter data of the glass preform, the measured diameter data is obtained by measuring the diameter of the glass preform along the longitudinal length of the preform before drawing the glass preform, and the feed speed (V1) is determined so that the feed speed (V1) varies depending on fluctuations of the measured diameter data in the longitudinal direction.

16 Claims, 7 Drawing Sheets

(56) References Cited

FOREIGN PATENT DOCUMENTS

| | | | |
|---|---|---|---|
| JP | 2005145765 A * | 6/2005 | ............ C03B 37/012 |
| JP | 2005-289774 | 10/2005 | |
| JP | 2006-193397 | 7/2006 | |
| JP | 2006-219331 | 8/2006 | |
| WO | 2005/056487 | 6/2005 | |

OTHER PUBLICATIONS

European Search report issued Dec. 19, 2011 in Application No. 11180378.9.

Extended European Search report in related European Application No. EP 11180370, Dec. 21, 2011.

U.S. Appl. No. 13/226,609, Mar. 4, 2013, Office Action.

Chinese Office Action from related Chinese Application No. 201110268760.7, dated Sep. 10, 2013.

Office Action from corresponding Chinese Patent Application No. 201110268775.3 dated Sep. 27, 2013.

U.S. Appl. No. 13/226,609, Jul. 25, 2013, Final Office Action.

U.S. Appl. No. 13/226,609, filed Jun. 13, 2014, Non-Final Office Action.

\* cited by examiner

APPARATUS FOR FABRICATING A GLASS ROD AND METHOD OF SAME

CROSS-REFERENCES TO RELATED APPLICATIONS

This application claims the benefit of Japanese Patent Application Nos. 2010-200506, filed Sep. 8, 2010, and 2011-194106, filed Sep. 6, 2011, which are hereby incorporated by reference herein in their entirety.

BACKGROUND OF THE INVENTION

1. Field of the Invention

The present invention relates to an apparatus for fabricating a glass rod and a method for the same, in particular, to an apparatus and method for fabricating a desirable diameter glass rod by feeding a relatively large diameter glass preform such as an optical fiber glass ingot into a furnace, heating the preform in the furnace and drawing the heated preform from the furnace.

2. Description of the Related Art

Japanese Patent Laid-Open No. 2006-193397 discloses a method for fabricating a desirable diameter glass rod by measuring a diameter of a preform during drawing at a region where a deformation (diameter reduction) is progressing and a diameter at a region where the diameter reduction is almost completed, and adjusting the feed speed and drawing speed of the glass preform with respect to a furnace based on the measured diameters.

The description of known art in Japanese Patent Laid-Open No. H11-011970 (1999) discloses a method of pre-measuring a diameter of a glass preform along a longitudinal direction of the glass preform, determining a ratio between a feed speed and a drawing speed of the preform, and fabricating a constant diameter glass rod based on the ratio.

Japanese Patent Laid-Open No. 2006-219331 discloses suppression of diameter fluctuations of a drawn glass rod caused by a shifting of a reference position defining a feed speed and a drawing speed of a glass preform as drawing process progresses, by changing the amount of a feed and the reference diameter position of the glass preform.

Conventionally, the ratio of the target diameter of a glass rod with respect to the diameter of a glass preform (referred to as a diameter reduction ratio below) has been about 20% to 50% and relatively small. Accordingly, the control method of Japanese Patent Laid-Open No. 2006-193397 could suppress the diameter fluctuation to a required level. Recently, however, a larger size optical fiber preform is required, and a glass rod having a relatively small diameter deformation, in which a diameter reduction ratio is about 60% to 95%, is required. For example, when a 160 mm to 170 mm diameter glass preform is drawn into a 150 mm diameter glass rod, the diameter reduction ratio is 88% to 94%.

To implement the feedback control disclosed in Japanese Patent Laid-Open No. 2006-193397, it is necessary to measure the diameter at around a position where the diameter is substantially reduced in a diameter decreasing region. In case of a relatively large diameter reduction ratio, however, a position where the diameter is substantially reduced is adjacent the heater in a furnace. Accordingly, it is difficult to directly measure the diameter at this position. If the diameter used for the feedback control is measured at a location spaced from the heater to some extent so as to prevent an affection of the heater, the response of the feedback control could be lagged. Thus the feedback control may not be appropriately implemented. As a result, a large fluctuation can be generated in a drawn glass rod.

According to the method disclosed in Japanese Patent Laid-Open No. H11-011970 (1999), a relatively desirable diameter fluctuation value can be obtained even at a diameter reduction ratio of 60% to 95% in the case of a constantly stable diameter glass preform. The method, however, may cause an unacceptable diameter fluctuation (specifically, more than ±1%) at an end portion of a usable region in a drawn glass rod at the end of a drawing process, when a glass preform has a relatively large diameter fluctuation in a longitudinal direction thereof.

The method disclosed in Japanese Patent Laid-Open No. 2006-219331 can suppress a diameter fluctuation of a glass rod. In the method, however, a criterion for changing the reference diameter position is indefinite, and an unacceptable diameter fluctuation may be generated depending on a condition of the diameter fluctuation of the glass preform. In addition, in the embodiment of the publication, a 130 mm diameter glass preform is drawn into a 30 mm diameter glass rod, that is, the diameter reduction ratio is considerably small, such as 23%. The publication fails to disclose a method for suppressing a diameter fluctuation of a drawn glass rod in case of a relatively large diameter ratio such as 60 to 95%.

SUMMARY OF THE INVENTION

The present invention provides an apparatus and a method for fabricating a glass rod capable of suppressing a diameter fluctuation in a drawn glass rod even in case of a relatively large diameter reduction ratio between a glass preform and a glass rod, such as 60 to 95%.

A first aspect of the present invention provides a method of fabricating glass rod that feeds a relatively large diameter glass preform into a furnace through a top portion of the furnace and draws the glass preform from the furnace through a bottom portion of the furnace so that the relatively large diameter glass preform is drawn into a relatively small diameter glass rod, includes the steps of:

controlling a feed speed (V1) and a drawing speed (V2) of the glass preform so that a ratio (V2/V1) between the feed speed (V1) and the drawing speed (V2) becomes a value ((D/d)$^2$) determined based on a diameter (D) of the glass preform and a target diameter (d) of the glass rod;

acquiring the diameter (D) of the glass preform for determining the ratio from a measured diameter data, the measured diameter data being obtained by measuring a diameter of the glass preform before being drawn along a longitudinal direction thereof; and determining the feed speed (V1) so that the feed speed (V1) varies depending on a fluctuation of the measured diameter data in the longitudinal direction.

A second aspect of the present invention provides an apparatus for fabricating a glass rod, including:

a furnace;

a feeding mechanism configured to feed a relatively large diameter glass preform into a furnace through a top portion of the furnace;

a drawing mechanism configured to draw the glass preform from the furnace through a bottom portion of the furnace so that the relatively large diameter glass preform is drawn into a relatively small diameter glass rod;

a controller configured to control a feed speed (V1) of the glass preform by the feeding mechanism and a drawing speed (V2) of the preform by the drawing mechanism so that a ratio (V2/V1) between the feed speed (V1) and the drawing speed (V2) becomes a value ((D/d)²) determined based on a diameter (D) of the glass preform and a target diameter (d) of the glass rod, wherein the controller includes:

an acquisition unit configured to acquire the diameter (D) of the glass preform for determining the ratio from a measured diameter data, the measured diameter data being obtained by measuring a diameter of the glass preform before being drawn along a longitudinal direction thereof; and a determination unit configured to determine the feed speed (V1) so that the feed speed (V1) varies depending on a fluctuation of the measured diameter data in the longitudinal direction.

According to the present invention, a diameter for determining a ratio between a feed speed and a drawing speed is determined from pre-measured diameter data, and the feed speed is adjusted depending on a diameter fluctuation of the preform. As a result, a diameter fluctuation of a drawn glass rod in a longitudinal direction of the glass rod can be suppressed.

Further features of the present invention will become apparent from the following description of exemplary embodiments (with reference to the attached drawings).

DESCRIPTION OF THE EMBODIMENTS

Figure 1:
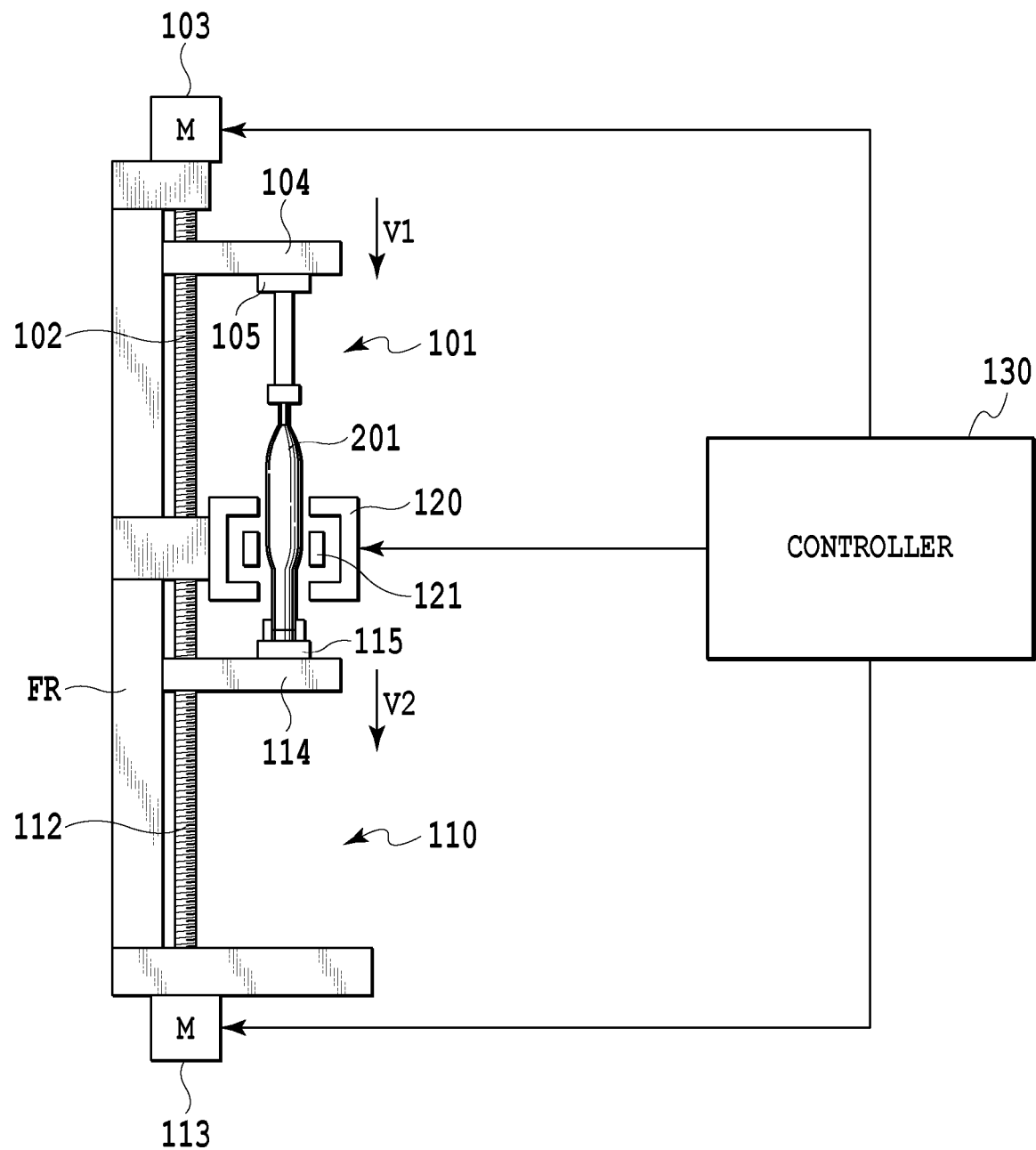
FIG. 1 is a view schematically showing an apparatus for fabricating a glass rod according to an embodiment of the present invention.

An embodiment of the present invention will be described below with reference to the attached drawings. FIG. 1 schematically shows an apparatus for fabricating a glass rod according to an embodiment of the present invention. The fabricating apparatus has a feeding mechanism 101 and a drawing mechanism 110, which are disposed on a frame FR vertically extending, respectively, a furnace 120 disposed on the frame between the feeding mechanism 101 and the drawing mechanism 110, and a controller 130.

The feeding mechanism 101 has a screw shaft 102 vertically extending and rotatably supported, a motor 103 for driving the screw shaft 102, a movable member 104 into which the screw shaft 102 is screwed, and a chucking mechanism 105 which is disposed on the movable member 104 and holds a upper end portion of an optical fiber glass preform 201.

The drawing mechanism 110 has a vertically extending and rotatably supported screw shaft 112, a motor 113 for driving the screw shaft 112, a movable member 114 into which the screw shaft 112 is screwed, and a chucking mechanism 115 which is disposed on the movable member 114 and holds a lower end portion of the optical fiber glass preform 201.

The furnace 120 has an annular heater 121 therein, and heats an optical fiber glass preform 201 passing through a central portion of the heater 121.

The controller 130 is constituted by hardware such as a processor and a memory, and required software, and is electrically connected to the motors 103 and 113, and to the furnace 120. Specifically, the controller 130 controls rotational velocities of the motors 103 and 113, and a temperature in the furnace 120.

Drawing of a glass preform by the apparatus in FIG. 1 will be described. First, a glass preform 201 having a relatively large diameter is fed into the furnace 120 through the top portion of the furnace by the feeding mechanism 101. The glass preform 201 fed into the furnace 120 is drawn from the furnace 120 through a bottom portion of the furnace by the drawing mechanism 110 so that the glass preform 201 is drawn to a relatively small diameter glass rod. At that time, the feeding mechanism 101 and the drawing mechanism 110 are controlled so that a ratio V2/V1 between a feed speed V1 and a drawing speed V2 of the glass preform 201 becomes a value (D/d)² which is defined by a diameter D of the glass preform and a target diameter d of the glass rod. That is, the feed speed V1 and the drawing speed V2 are controlled so that a relation defined by the following formula (1) is satisfied.

$$V2/V1 = (D/d)^2 \quad (1)$$

In the present embodiment, during drawing control, the diameter D of the glass preform for determining the ratio between the feed speed V1 and the drawing speed V2 is acquired from measured diameter data of the glass preform, which are obtained by pre-measuring the diameter of the glass preform along the longitudinal length of the glass preform before drawing the glass preform. The measured diameter data of the glass preform 201 to be drawn is associated with a longitudinal position of the preform and stored in a storage device such as a memory in the controller 130. In particular, the diameter D of the glass preform 201 is acquired from the measured diameter data at a diameter acquisition position which is a predetermined distance from a reference position of the heater 121 in the furnace 120. The predetermined distance is set to a specific drawing reference distance. The specific drawing reference distance will be discussed later. In addition, a feed speed V1 is determined so that a feed speed V1 varies depending on a fluctuation of the measured diameter data in the longitudinal direction. In particular, the feed speed V1 is determined by using the diameter D acquired at the diameter acquisition position and diameter and feed speed data defining the relationship between the diameter of the glass preform 201 before being drawn and the feed speed V1. The diameter and feed speed data will be discussed later.

Figure 2:
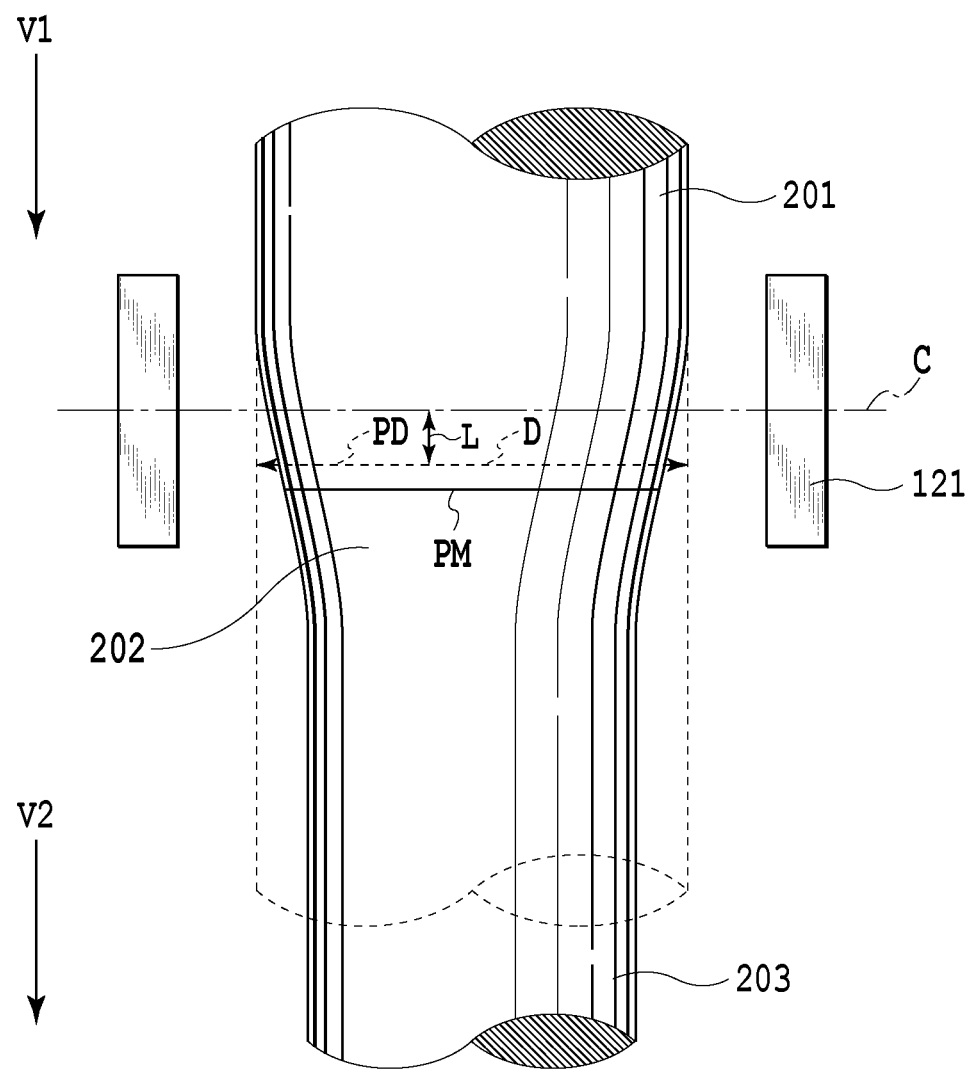
FIG. 2 is a schematic view for explaining a drawing reference distance in a diameter decreasing region.

Next, the drawing reference distance will be discussed with reference to FIG. 2. The glass preform 201 is fed into the furnace 120 through the top portion of the furnace at the feed speed V1, heated by the heater 121, and drawn from the furnace 120 through the bottom portion of the furnace. Here, a tension is created on the glass preform 201 by setting V2>V1. A heated and softened region of the glass preform 201 is stretched due to the difference between the feed speed and drawing speed, so that a diameter decreasing region 202 is formed where the diameter is gradually reduced in the longitudinal direction. The diameter of the glass preform 201 is reduced in the diameter decreasing region 202 to thereby form a relatively small diameter glass rod 203.

The glass preform 201 fed into the furnace 120 is heated by the heater 202 so that the temperature of the preform 201 in the longitudinal direction reaches a maximum temperature at a position below a middle position C of the heater 121 and gradually decreases from the maximum temperature position downward. Accordingly, a position PM where a deformation rate (an amount of diameter reduction per unit length in the longitudinal direction) is largest is located below the heater middle position C at any time.

Here, VM indicates a volume of the glass preform 201 from the heater middle position C to the position PM, ND indicates a diameter of the glass preform 201 before being drawn, L indicates a drawing reference distance. In the present embodiment, the drawing reference distance L is defined by the following formula (2).

$$L = VM/(\pi \times (ND/2)^2) \qquad (2)$$

The drawing reference distance L is defined based on the distance from the heater middle position C to the position on the glass preform being drawn, and varies depending on the feed speed and the diameter of the glass preform before being drawn, as described later. That is, the drawing reference distance L is the distance between the heater middle position C and a specific position which is defined depending on the deformation condition of the diameter decreasing region on the glass preform. Accordingly, the drawing reference distance L depends on the position PM in the diameter decreasing region 202, where the deformation rate is largest.

In the present embodiment, the diameter of the glass preform before being drawn is used to determine the feed speed and the drawing speed. The diameter is acquired from the measured diameter data at a position that is a predetermined distance away from the heater middle position C. The predetermined distance is set to a specific drawing reference distance. In addition, the feed speed V1 is adjusted depending on diameter fluctuations of the glass preform to be drawn to keep the drawing reference distance at the specific drawing reference distance. By so doing, a position PM where the deformation rate is largest is maintained at a constant position, so that a glass rod having a stable and constant diameter can be fabricated. If the drawing reference distance during drawing was different from the actual specific drawing reference position, the preform would be drawn at a different position from the position corresponding to the actual specific drawing reference distance, which would result in fluctuations in the finished diameter. Accordingly, if the preform before being drawn has a diameter fluctuation in the longitudinal direction, it is very important to precisely set the drawing reference distance to the specific drawing reference distance. The diameter decreasing region 202, however, is located close to the heater 121, so it is difficult to directly measure the shape of the diameter decreasing region 202 during drawing. For this reason, in the present embodiment, the drawing reference distance during drawing is calculated or estimated from a preliminary experiment or data acquired from a glass preform while the glass preform is drawn in a steady state.

Figure 3A:
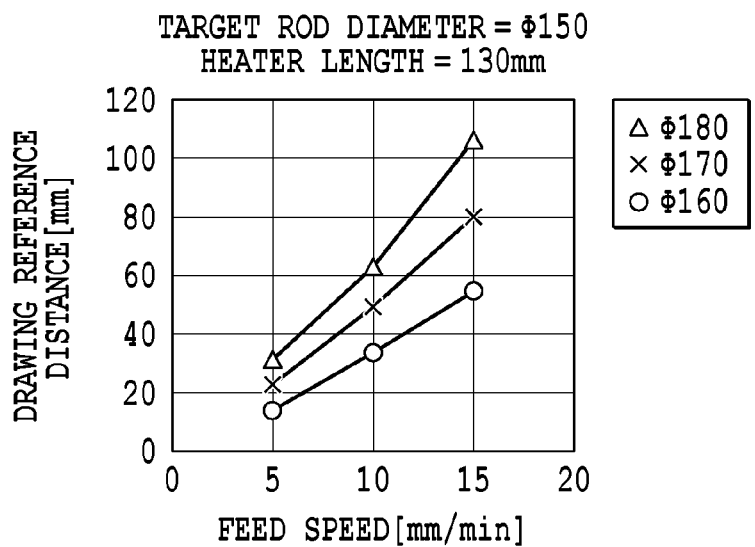
FIG. 3A is a graph showing a relation between a drawing reference distance and a feed speed in case where 160, 170 and 180 mm diameter glass preforms are drawn into 150 mm target diameter glass rods.
Figure 3B:
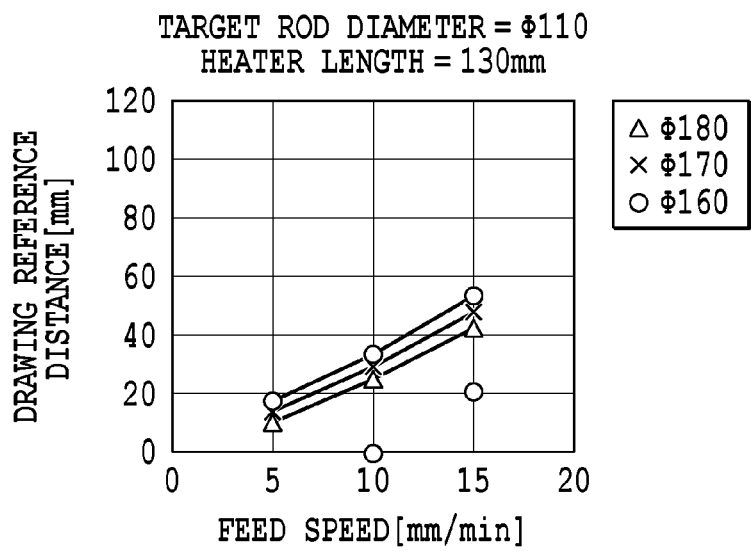
FIG. 3B is a graph showing a relation between a drawing reference distance and a feed speed in case where 160, 170 and 180 mm diameter glass preforms are drawn into 110 mm target diameter glass rods.
Figure 3C:
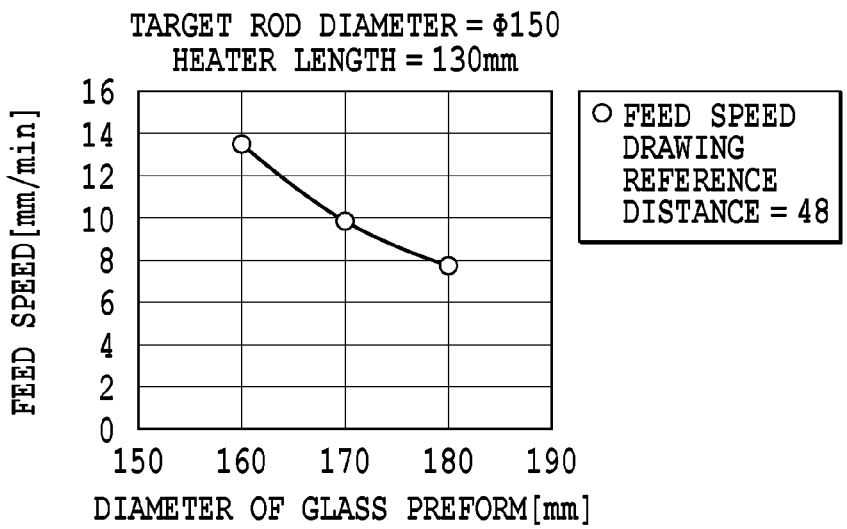
FIG. 3C is a graph showing a relation between a diameter of a glass preform and a feed speed at a 48 mm drawing reference distance, which is determined from data of FIG. 3A.

The present inventor investigated the relationship between the drawing reference distance L, the feed speed V1 and the diameter D of the glass preform before being drawn. In particular, the glass preform diameter D, the glass rod target diameter d and the feed speed V1 were set to a variety of values, and the drawing reference distance L was measured from the actual shape of the diameter decreasing region 202. The results are shown in FIGS. 3A to 3C. FIG. 3A shows the relationship between the drawing reference distance and the feed speed in cases where 160, 170 and 180 mm diameter glass preforms were drawn into 150 mm target diameter glass rods, respectively. FIG. 3B shows the relationship between the drawing reference distance and the feed speed in cases where 160, 170 and 180 mm diameter glass preforms were drawn into a 110 mm target diameter glass rod. As can be seen from the relationship between the feed speed and the glass preform diameter with respect to the plurality of drawing reference distances, the drawing reference distance L varies depending on the glass preform diameter and the feed speed. FIG. 3C shows diameter and feed speed data. Specifically, FIG. 3C shows the relationship of the feed speed V1 with respect to the glass preform diameter D when the drawing reference distance is 48 mm. The diameter and feed speed data is stored in a storage device such as a memory in the controller 130. Alternatively, a function for defining the relationship between the glass preform diameter D and the feed speed V1 can be used instead of the data.

Figure 4:
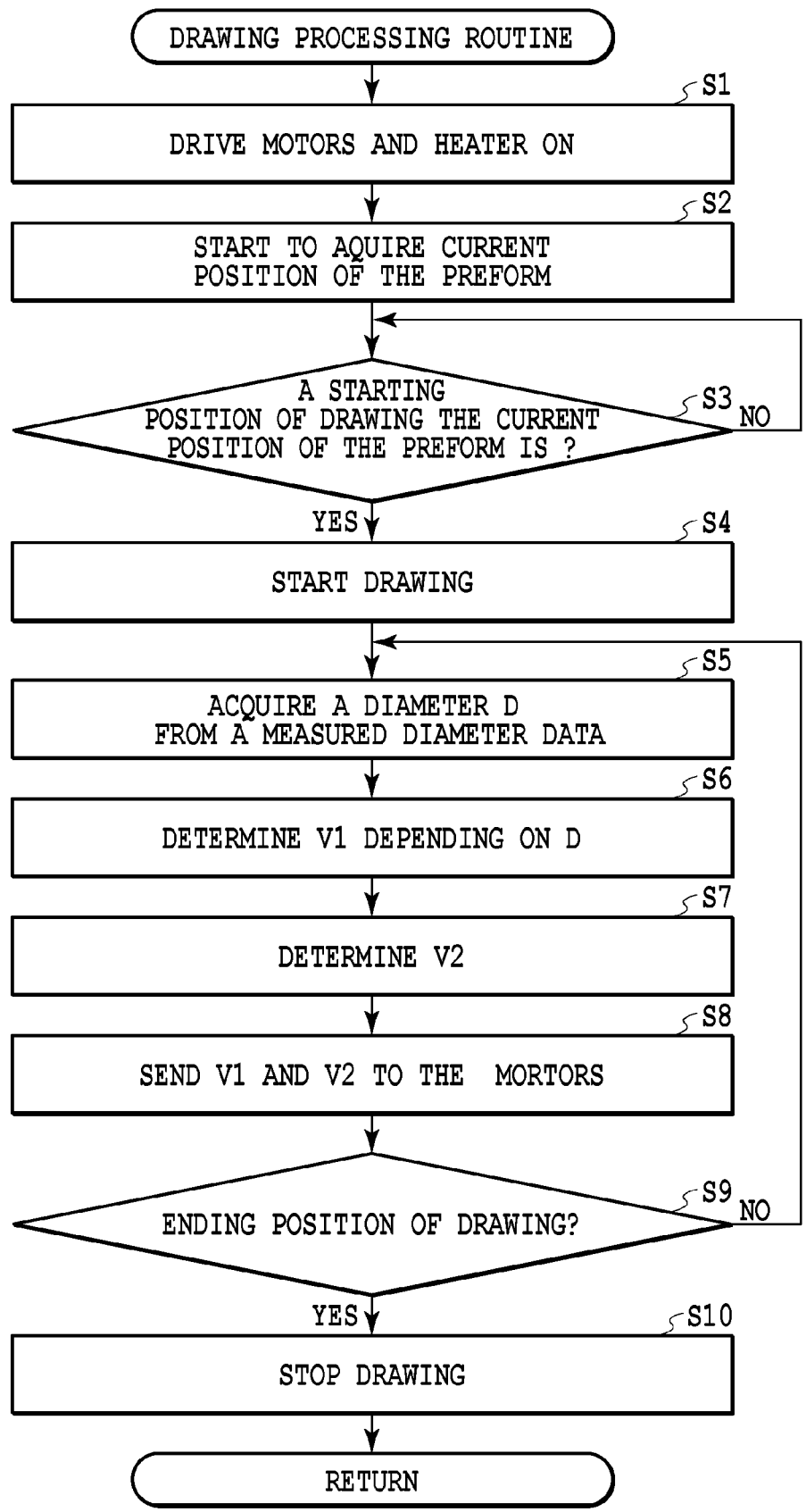
FIG. 4 is a flow chart showing an example of a drawing process by the controller of FIG. 1.

Next, an example of a drawing process by the above controller will be described with reference to FIG. 4. First, a glass preform 201 having a pre-measured diameter is positioned on the apparatus of FIG. 1, the heater 121 is switched on, and the motors 103 and 113 are driven to feed the glass preform 201 into the furnace 120 (S1).

If starting to heat the glass preform from a drawing start position of a usable region of the preform which can be used for forming a glass rod, a diameter fluctuation may be generated on the drawing start side of the preform because the temperature distribution of the preform has not been in a steady state yet. To prevent this, it is necessary to start to heat the glass preform so as to make a temperature distribution at the drawing start position steady before the drawing start position of the usable region of the glass preform reaches the heater middle position C in furnace 120.

The length of the region the a position to start heating the glass preform and the drawing start position of the usable region of the glass preform (which is referred to as a preliminary heating region below) is preferably set to be greater than or equal to the length of the heater to provide a stable temperature distribution. Extending the preliminary heating region more than necessary is disadvantageous in production efficiency because of a large loss of the glass preform, so the length of the preliminary heating region is preferably set to be less than three times of the length of the heater.

Next, an acquisition of the current position of the glass preform 201 in the longitudinal direction relative to the furnace 120 is started (S2). The current position of the glass preform 201 relative to the heater 121 can be acquired using, for example, a rotational position detector (not shown in the figures) incorporated in the motor 103. Next, it is determined if the drawing start position of the glass preform 201 has reached the position where the drawing start position is spaced from the heater middle position C by a predetermined distance which is set to be the specific drawing reference distance. If has, the drawing process is started (S4).

With the drawing process being started, the diameter D at the position PD which is spaced from the heater middle position C by a predetermined distance on the glass preform 201 on the move is acquired (S5). The diameter D can be determined from the current position information of the glass preform 201 relative to the heater 121 and the measured diameter data of the glass preform 201.

Next, the feed speed V1 corresponding to the diameter D acquired at the step S5 is determined (S6). This can be determined from the diameter and feed speed data shown in FIG. 3C. When there is a diameter fluctuation in the longitudinal direction of the glass preform, the feed speed V1 is varied depending on the fluctuation.

Next, the drawing speed V2 is determined (S7). The drawing speed V2 can be calculated from the above formula (1). A control command that reflects the determined feed speed V1 and drawing speed V2 is sent to the motors 103 and 113 (S8).

Next, whether the glass preform has reached the ending position of the usable region is determined (S9). If the glass preform has not reached the ending position, the steps S5 to S8 are repeated. Otherwise, the drawing processing is terminated (S10).

In the present embodiment, the diameter and feed speed data as shown in FIG. 3C shows the relationship between the feed speed and the glass preform diameter D before being drawn, so that the drawing reference distance of the glass preform during drawing is maintained at the predetermined distance (the specific drawing reference distance). Accordingly, even if the diameter of the glass preform during drawing fluctuates, the feed speed is adjusted depending on the diameter fluctuation so as to keep the drawing reference distance at the predetermined distance. As a result, the drawing reference distance is maintained at the constant value, such that diameter fluctuations of the drawn glass can be suppressed.

The method of the present embodiment provides a great technical effect especially when the glass rod target diameter d is 60 to 95% of the glass preform diameter D. As can be seen from a comparison between FIG. 3A and FIG. 3B, the amount of change of drawing reference distance associated with variation of the feed speed and the diameter is relatively larger in a drawing process with a relative large diameter reduction ratio in which a 160 mm diameter glass preform is drawn into a 150 mm diameter glass rod and the ratio is 94%. Specifically, in a case of such a relatively large diameter reduction ratio, drawing according to the present invention is significantly useful. Also, the change of drawing reference distance associated with a variation in the glass preform diameter can be seen even in the drawing of a relative small diameter reduction ratio such as from a 180 mm diameter glass preform to a 110 mm diameter glass rod as shown in FIG. 3B, however, the amount of the change is relatively small. When the diameter reduction rate is less than 60%, a conventional method can be alternated, and the method of the present invention also can provide a desirable result. On the other hand, when the diameter reduction rate is over 95%, it is difficult to maintain an appropriate drawing load during drawing so that a drawn glass rod may have deflection.

Conventionally, if the diameter fluctuation of the glass rod becomes large when the diameter is reduced in a drawing furnace, the diameter fluctuation can be modified by re-drawing using an existing glass lathe. However, if the glass rod diameter is more than 110 mm, it becomes difficult or impossible to re-draw because heat efficiency decreases during re-drawing using existing glass lathes. Accordingly, if the glass rod target diameter is over 110 mm, a glass rod having a decreased diameter fluctuation cannot be fabricated unless the present invention is utilized. In such a case, the present invention is effective.

Example 1

A glass preform having tapered portions at both ends, a 1000 mm length usable region of the preform, a diameter of 160.5 mm at a drawing start position, a diameter of 173 mm at a drawing ending position, and a fluctuated diameter in the usable region was drawn under conditions of a 130 mm heater length, a 48 mm drawing reference distance, a 150 mm glass rod target diameter, and a 200 mm length of the preliminarily heated region on the drawing start side. The glass preform was positioned so that the drawing start position was located 152 mm above the heater middle position C. The drawing was started at a heater temperature of 2050 degrees Celsius. The feed speed of the preliminarily heated region was set to 13.3 mm/min. A portion of the tapered portion on the drawing start side that had a diameter greater than 150 mm was drawn at a drawing speed calculated using the formula (1) while the target diameter of the portion was set to the 150 mm glass rod target diameter.

A feed amount of the glass preform was set to 0 mm at the time point that the 200 mm length of preliminarily heated region passed through the heater middle position C. From here, the glass preform was moved 1000 mm which was the length of the usable region. During this time, the feed speed was determined from the relationship between the diameter and feed speed of the glass preform of FIG. 3C depending on the diameter fluctuation of the glass preform. The drawing speed was determined using the formula (1) based on the feed speed, the preform diameter before being drawn and the glass rod target diameter. As a result, the drawing reference distance during drawing was kept at the predetermined length (48 mm).

Figure 5:
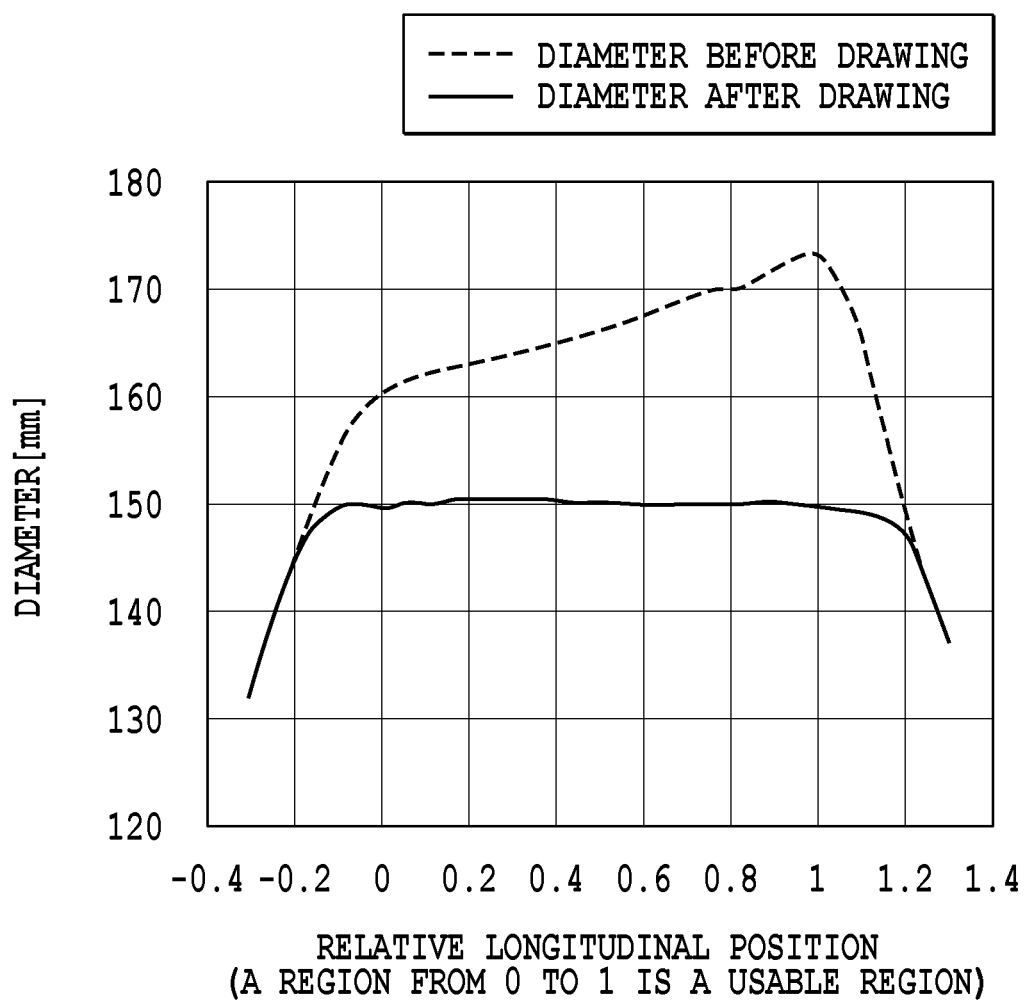
FIG. 5 is a graph showing a diameter fluctuation of a glass preform before and after drawing in Example 1.

Another 200 mm length region was further drawn after the usable region passed through a position spaced from the heater middle position C by a distance of 48 mm. During this time, the feed speed was maintained at 9.0 mm/min, which was the final feed speed of the usable region. The portion of the tapered portion on the drawing ending side that had a diameter greater than 150 mm was drawn at a drawing speed calculated using the formula (1) while the target diameter of the portion was set to the 150 mm glass rod target diameter. As a result, as shown in FIG. 5, a very small diameter fluctuation, in which the difference between the maximum diameter and the minimum diameter is approximately 1.0 mm, could be obtained.

Comparative Example 1

A glass preform having tapered portions at both ends, a 1000 mm length usable region of the preform, a diameter of 160 mm at a drawing start position, a diameter of 170.5 mm at a drawing ending position, and a fluctuated diameter in the usable region was drawn under conditions of a 130 mm heater length, a 41 mm drawing reference distance, a 150 mm glass rod target diameter, and a 200 mm length of the preliminarily heated region on the drawing start side. The feed speed V1 of the glass preform was fixed at 10 mm/min, that is, the feed speed V1 was constant. The glass preform was positioned so that the drawing start position was located 159 mm above the heater middle position C. The drawing was started at a heater temperature of 2050 degrees Celsius. A portion of the tapered portion on the drawing start side that had a diameter greater than 150 mm was drawn at a drawing speed calculated using the formula (1) while the target diameter of the portion was set to the 150 mm glass rod target diameter. A feed amount of the glass preform was set to 0 mm at the time point that the 200 mm length of preliminarily heated region passed through the heater middle position C, and 1000 mm length of the usable region of the glass preform was fed. During this drawing, the drawing speed was determined using the formula (1) based on the feed speed and diameter of the glass rod.

Figure 6:
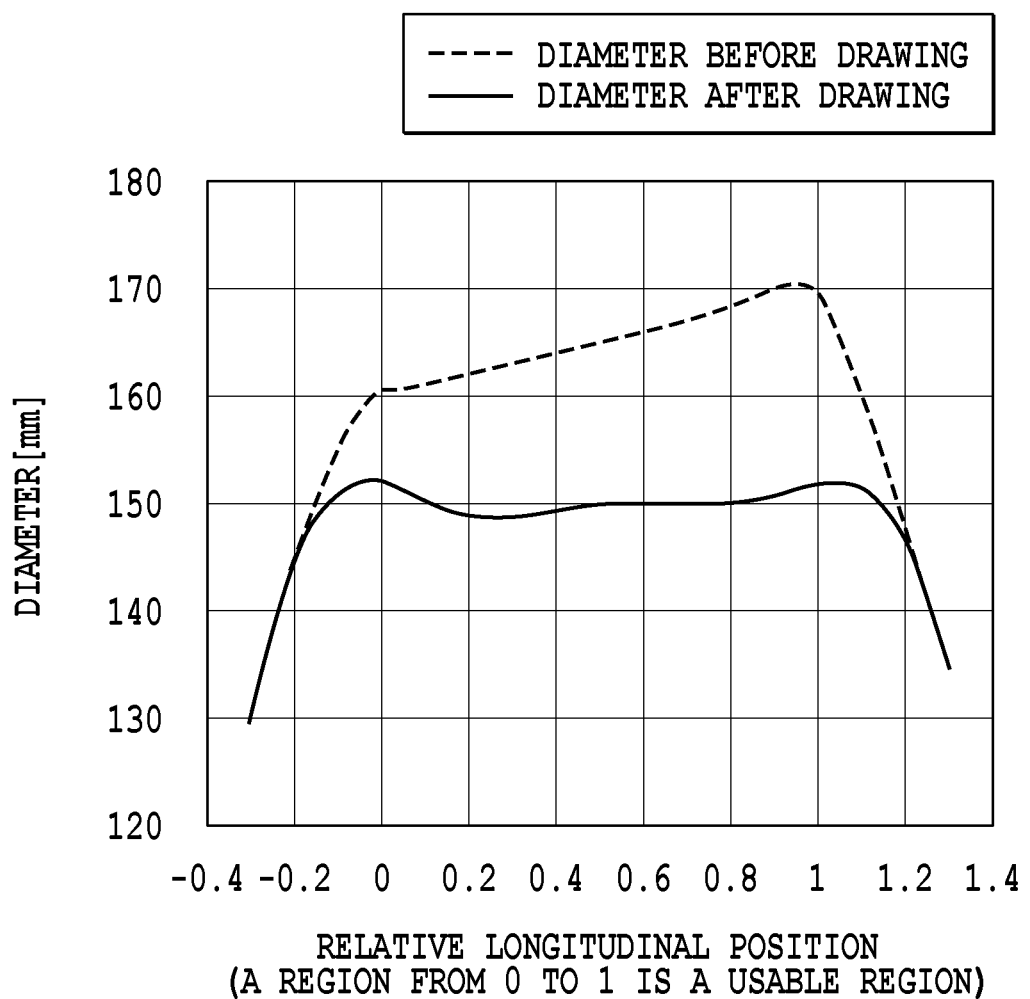
FIG. 6 is a graph showing a diameter fluctuation of a glass preform before and after drawing in Comparative example 1.

Another 200 mm length region was further drawn after the usable region passed through a position spaced from the heater middle position C by a distance of 41 mm. The portion of the tapered portion on the drawing ending side that had a diameter greater than 150 mm was drawn at a drawing speed calculated using the formula (1) while the target diameter of the portion was set to the 150 mm glass rod target diameter. As a result, as shown in FIG. 6, the range of diameter fluctuation was approximately 3.1 mm, and the diameter fluctuation was larger than that of Example 1.

Comparative Example 2

A glass preform having tapered portions at both ends, a 1000 mm length usable region of the preform, a diameter of 161.2 mm at a drawing start position, a diameter of 169 mm at a drawing ending position, and a fluctuated diameter in the usable region was drawn under conditions of a 130 mm heater length, a 48 mm drawing reference distance, a 150 mm glass rod target diameter, and without a preliminarily heated region on the drawing start side. The glass preform was positioned so that the drawing start position was located 48 mm below the heater middle position C. The drawing was started at a heater temperature of 2050 degrees Celsius.

Figure 7:
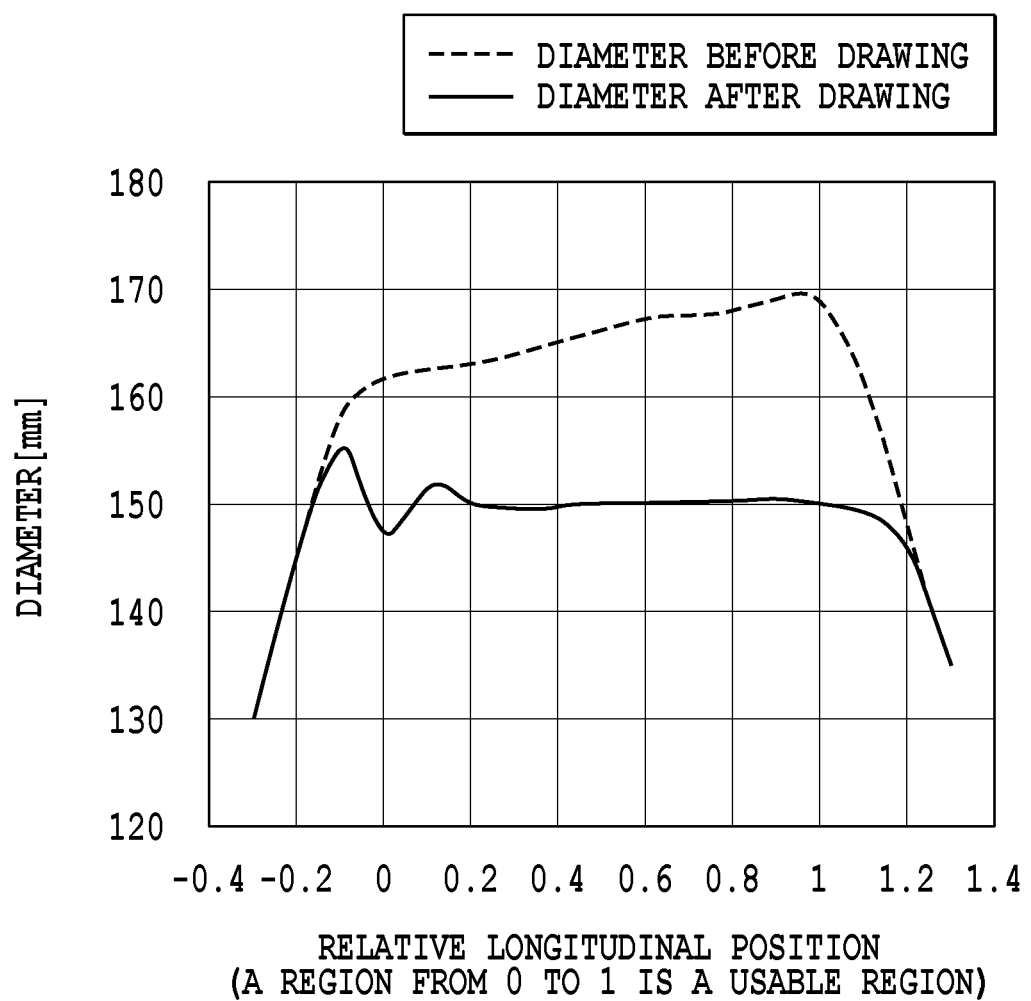
FIG. 7 is a graph showing a diameter fluctuation of a glass preform before and after drawing in Comparative example 2.

A feed amount of the glass preform was set to 0 mm when the glass preform was initially set. From here, the glass preform was moved 1000 mm which was the length of the usable region. During this time, the feed speed was determined from the relationship between the diameter and feed speed of the glass preform of FIG. 3C depending on the diameter fluctuation of the glass preform. The drawing speed was determined using the formula (1) based on the feed speed, the preform diameter before being drawn and the glass rod target diameter. Another 200 mm length region was further drawn after the usable region passed through a position spaced from the heater middle position C by a distance of 48 mm. During this time, the feed speed was maintained at 10.1 mm/min, which was the final feed speed of the usable region. The portion of the tapered portion on the drawing ending side that had a diameter greater than 150 mm was drawn at a drawing speed calculated using the formula (1) while the target diameter of the portion was set to the 150 mm glass rod target diameter. As a result, as shown in FIG. 7, a large diameter fluctuation of +1.5 mm/−3 mm was generated on the drawing start side, and the diameter fluctuation was larger than that of Example 1.

INDUSTRIAL APPLICABILITY

According to the present invention, diameter fluctuation of a drawn glass rod in a longitudinal direction can be suppressed when drawing at a relatively large diameter reduction ratio.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of fabricating a glass rod from an elongated glass preform using a furnace, the furnace extending between an input end and an opposing output end, the glass rod being fabricated so as to have a target diameter, the glass preform having a region thereof extending in a longitudinal direction between a drawing start position and a drawing end position, the distance between the drawing start position and the drawing end position defining a length of the region, the glass preform having a pre-drawn diameter, the value of which varies over the length of the region, the method comprising:
   determining values of the pre-drawn diameter of the glass preform over the length of the region;
   feeding the glass preform longitudinally into the input end of the furnace at a variable feed speed such that a plurality of points longitudinally spaced along the region pass a reference position of the furnace as the glass preform is fed into the furnace, the feed speed being controlled so as to vary over the length of the region, the variance of the feed speed at each point of the region being based on the value of the pre-drawn diameter of the glass preform at a diameter acquisition position corresponding to the particular point, the diameter acquisition position being longitudinally separated from the particular point of the region by a predetermined drawing reference distance that remains fixed over the length of the region, wherein feeding the glass preform into the furnace causes a diameter decreasing region to be formed in the glass preform, the diameter decreasing region having a position PM at which a deformation rate of the glass preform is at a maximum value, the position PM being dependent on the feed speed, and the feed speed being varied to maintain the predetermined drawing reference distance at a constant value as the glass preform is fed into the furnace, the predetermined drawing reference distance L being defined by the following equation:

$$L = VM/(\pi \times (D/2)^2),$$

where:
   VM is the volume of the glass preform between the reference position of the furnace and the position PM, and
   D is the value of the pre-drawn diameter of the glass preform corresponding to the diameter acquisition position; and
drawing the glass preform from the output end of the furnace at a variable drawing speed V2 as the glass preform is fed into the furnace, the variable drawing speed being controlled so that as each point of the region passes the reference position of the furnace, the following equation is satisfied:

$$V2/V1 = (D/d)^2,$$

where:
   V1 is the variable feed speed already determined for the particular point of the region,
   D is the value of the pre-drawn diameter of the glass preform at the diameter acquisition position corresponding to the particular point of the region, and
   d is the target diameter of the glass rod.

2. The method recited in claim 1, wherein the feed speed values are determined using pre-existing relationship data based on actual measurements of other glass preforms.

3. The method recited in claim 1, wherein the feed speed values are determined using values of feed speeds previously determined for various other glass preforms corresponding to various combinations of glass preform diameters and target diameters with the predetermined fixed drawing reference distance, by measuring the actual shape of diameter decreasing regions of the other glass preforms.

4. The method recited in claim 1, wherein a diameter reduction ratio (d/D) between the target diameter of the glass rod d and the value of the pre-drawn diameter of the glass preform D is between 60% and 95% over the length of the region.

5. The method recited in claim 1, wherein the target diameter of the glass rod is set to be greater than or equal to 110 mm.

6. The method recited in claim 1, further comprising, before feeding the glass preform into the furnace, preheating the glass preform at the drawing start position.

7. The method recited in claim 1, wherein the feed speed values are determined based on pre-existing data that defines a relationship between feed speeds and pre-drawn diameters of glass preforms for the predetermined drawing reference distance.

8. The method recited in claim 1, wherein the values of the pre-drawn diameter of the glass preform are stored in a storage device before the glass preform is fed into the furnace.

9. A method of fabricating a glass rod from an elongated glass preform using a furnace, the furnace extending between an input end and an opposing output end, the glass rod being fabricated so as to have a target diameter, the glass preform having a region thereof extending in a longitudinal direction between a drawing start position and a drawing end position, the distance between the drawing start position and the drawing end position defining a length of the region, the glass preform having a pre-drawn diameter whose value varies over the length of the region, the method comprising:
  determining values of the pre-drawn diameter of the glass preform over the length of the region;
  moving the glass preform longitudinally through the furnace using a variable feed speed to feed the glass preform into the furnace and a variable drawing speed to draw the glass preform out of the furnace such that a plurality of points longitudinally spaced along the region pass a reference position of the furnace as the glass preform is moved through the furnace, a diameter acquisition position being defined as a position that is longitudinally separated from the reference position of the furnace by a predetermined fixed drawing reference distance, wherein moving the glass preform through the furnace causes a diameter decreasing region to be formed in the glass preform, the diameter decreasing region having a position PM at which a deformation rate of the glass preform is at a maximum value, the position PM being dependent on the feed speed, the feed speed and the drawing speed being controlled so as to vary over the length of the region by performing the following as each point of the region passes the reference position of the furnace:
    (a) determining a desired value for the feed speed for the particular point based on the value of the pre-drawn diameter of the glass preform corresponding to the diameter acquisition position and subsequently adjusting the variable feed speed to the desired value, the desired value of the feed speed being determined so as to maintain the fixed drawing reference distance at a constant value as the glass preform is moved through the furnace, the fixed drawing reference distance L being defined by the following equation:

$$L = VM/(\pi \times (D/2)^2),$$

where:
      VM is the volume of the glass preform between the reference position of the furnace and the position PM, and
      D is the value of the pre-drawn diameter of the glass preform corresponding to the diameter acquisition position; and
    (b) after the desired value for the feed speed has been determined for the particular point, setting the variable drawing speed based on the desired feed speed value and on the value of the pre-drawn diameter of the glass preform corresponding to the diameter acquisition position.

10. The method recited in claim 9, wherein setting the variable drawing speed at each point comprises setting a variable drawing speed V2 at each point so that the following equation is satisfied:

$$V2/V1 = (D/d)^2,$$

where:
    V1 is the desired value of the variable feed speed determined in (a) for the particular point of the region,
    D is the value of the pre-drawn diameter of the glass preform corresponding to the diameter acquisition position, and
    d is the target diameter of the glass rod.

11. The method recited in claim 9, wherein the desired value for the feed speed at each point is determined based on pre-existing data that defines a relationship between feed speeds and pre-drawn diameters of glass preforms for the fixed drawing reference distance.

12. The method recited in claim 9, wherein determining the value for the feed speed at each point of the region comprises:
  using values of feed speeds previously determined for various other glass preforms corresponding to various combinations of glass preform diameters and target diameters with the predetermined fixed drawing reference distance, by measuring the actual shape of diameter decreasing regions of the other glass preforms.

13. The method recited in claim 9, wherein the values of the pre-drawn diameter of the glass preform are stored in a storage device before the glass preform is moved through the furnace.

14. The method recited in claim 9, wherein a diameter reduction ratio (d/D) between the target diameter of the glass rod d and the value of the pre-drawn diameter of the glass preform D is between 60% and 95% over the length of the region.

15. The method recited in claim 9, wherein the target diameter of the glass rod is set to be greater than or equal to 110 mm.

16. The method recited in claim 9, further comprising, before feeding the glass preform into the furnace, preheating the glass preform at the drawing start position.

* * * * *